June 8, 1937.　　　M. F. CAMPBELL　　　2,083,145
OVEN INSERT HEATER
Filed June 27, 1935
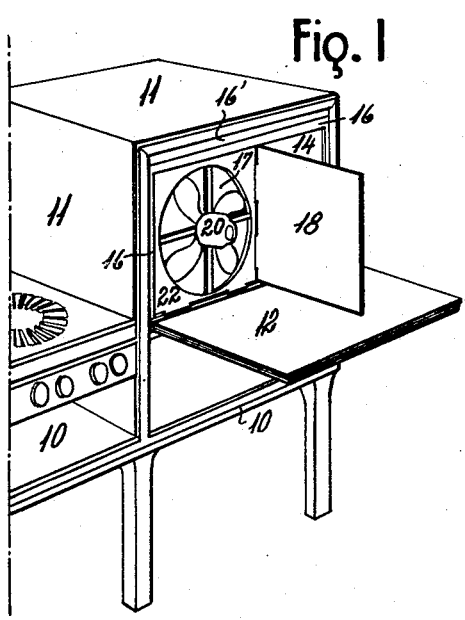
Fig. 1
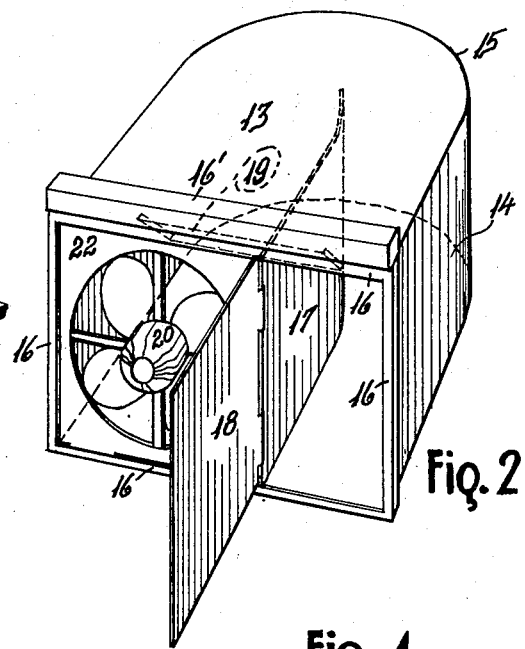
Fig. 2
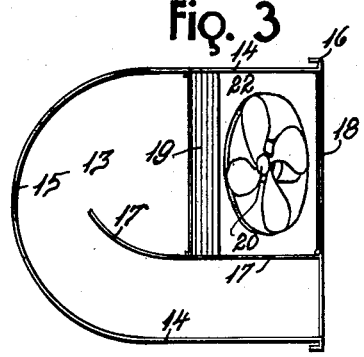
Fig. 3
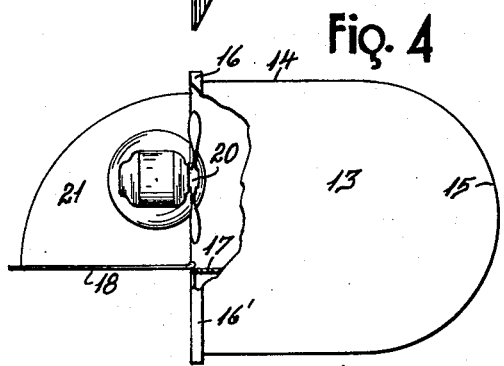
Fig. 4
Fig. 6
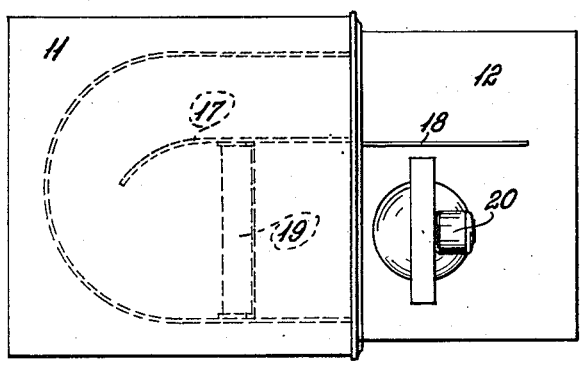
Fig. 5
Inventor
Michael F. Campbell
Homer G. Sweet
By
Attorney Patented June 8, 1937

2,083,145

UNITED STATES PATENT OFFICE 2,083,145

OVEN INSERT HEATER

Michael F. Campbell, Brighton, Colo.

Application June 27, 1935, Serial No. 28,652

5 Claims. (Cl. 126—4)

This invention relates to accessory heater devices adapted to be employed for the space heating of rooms, enclosures, and the like, and more particularly to heater devices arranged for operative combination with existing heat-generating facilities as found in conventional cooking apparatus, and has as an object to provide an improved device for the purpose set forth.

A further object of the invention is to provide an accessory heater device adapted to be employed in combination with conventional cook-stove ovens for space heating purposes.

A further object of the invention is to provide an improved accessory heater assembly arranged for ready removal and replacement relative to conventional cook-stove ovens for conversion of said ovens into space heating units.

A further object of the invention is to provide an improved construction and combination of elements in an oven insert assembly adapted for employment as a space heater.

A further object of the invention is to provide an improved accessory heater assembly of oven insert type which is compact in form, readily removable and replaceable, foldable to minimum size for storage purposes, readily extensible to operative relation of its elements, adaptable for cooperation with ovens of various heights, simple and inexpensive of manufacture and operative installation, positive and efficient in use, and of great convenience as a supplement to conventional cooking apparatus.

My invention consists in the construction, arrangement and combination of elements hereinafter set forth, pointed out in my claims, and illustrated by the accompanying drawing, in which—

Figure 1 is a fragmentary perspective view of the oven portion of a conventional cook-stove wherewith the improvement has been operatively combined. Figure 2 is a perspective view of the improved accessory heater assembly with its elements disposed and arranged for practical operation. Figure 3 is a bottom plan view of the assembly shown in Figure 2 as folded and arranged for storage purposes. Figure 4 is a top plan of an accessory heater construction modified somewhat in respect to the showing of Figures 2 and 3. Figure 5 is a top plan view of a cook-stove oven in operative combination with a yet further modified form of the invention. Figure 6 is a fragmentary, detail section of adjustable means provided for adapting the invention to ovens of varying heights.

In the construction of the improvement as shown, the numeral 10 designates a cook-stove of conventional type wherewith is operatively associated the usual oven element 11 to which access is had through the customary hinged door 12. While the stove 10 is illustrated as of gas type with its oven rising from and adjacent one end of said stove, it is to be understood that the specific illustration is but typical and in no sense limitative, and that the accessory heater comprising the instant invention may be employed with any and all types of stove and oven combinations wherewith such association may prove of advantage.

It is common practice to open the exterior doors of heated ovens for escape of the heated air therefrom to the end of heating the room or space wherein the oven element is located, but such practice is highly inefficient and generally unsatisfactory, the space heating thus obtained being relatively slight in proportion to its cost. The instant invention contemplates the provision of an oven insert assembly with may be employed in combination with a heated oven to efficiently heat and circulate air throughout the room or space adjacent a given oven.

As shown in Figures 2 and 3, the oven insert assembly comprises a suitable rigid housing formed of interconnected top wall 13, side walls 14 and one end wall 15, the latter being illustrated as arcuate and merging at its ends with the side walls 14, the housing thus formed having an open bottom and one open end. The insert housing just above described is of a size to be freely received within the oven 11 with its top, side and end walls spaced somewhat from the corresponding adjacent walls of the oven, the open bottom of the housing communicating directly with the normal bottom element of the oven. The open end of the insert housing is surrounded by a suitable frame 16 adapted to fit snugly within the open face of the oven and coact with margins of said oven face to substantially fill the latter. The frame 16 may be made of non-adjustable elements dimensioned to fit a given oven, oven enclosures being somewhat generally standardized as to size, or said frame elements may be provided with extensible portions whereby the external frame dimensions may be varied to adapt the insert assembly for use with ovens of various sizes. As illustrated, the vertical side members of the frame 16 are shown as non-adjustable and provided with integral flanges arranged to lie parallel with and closely against the vertical margins of the oven enclosure to more perfectly position the insert assembly relative to said oven and to minimize circulation of air and gases through the joint thus formed, while the upper horizontal portion of the frame 16 is shown as supporting a complementary flanged extension 16' in vertically adjustable relation therewith, which arrangement permits adapting of the insert assembly to closing relation with ovens of different height. When installed in an oven as shown in Figures 1 and 5, the insert assembly hereabove described forms a supplementary chamber within said oven opening directly against the oven bottom and through the oven face, said chamber being spaced from the sides, top and rear wall of the oven enclosure to provide space wherein the gases of combustion may collect for escape through the usual flue or vent without traversing the supplementary chamber. The insert housing is divided into two longitudinal compartments by means of a fixed partition 17, said partition preferably being disposed more nearly adjacent one of the side walls 14 than the other to form greater and lesser compartments and having its inner end spaced from the end wall 15 a distance substantially equal to the width of the lesser compartment and curved from the lesser toward the greater compartment, substantially as shown. A baffle plate 18, preferably of a size to close the open end of the greater compartment, is hinged at one margin to the forward margin of the partition 17 and is thereby disposed to function as a closure member for said greater compartment when the insert assembly is not in use and to act as an adjustable extension of the partition 17 for control of air flow through and from the assembly when in use. It will be obvious that the partition 17 and baffle 18 cooperate to define a U-shaped passage through the insert housing, and that air circulated through said passage will be subjected to heat generated within the oven 11, a rigid deflecting baffle 19 preferably being disposed transversely of the greater compartment of the insert assembly and arranged to direct incoming air downwardly and against the oven bottom, which latter is normally the hottest portion of an operating oven.

Any suitable means may be employed to direct air through the insert housing, one such means being shown in Figure 5 as an ordinary electric fan assembly 20, of pedestal type, positioned on the open oven door 12 to force air into the greater compartment of the insert assembly, said air naturally becoming heated within the insert chamber and escaping therefrom around the inner end of the partition 17 and through the lesser compartment of the assembly as directed by the baffle 18. Substantially the same arrangement is shown in Figure 4, said latter figure, however, including a fan support independent of the oven door, said support being shown as a segmental flange 21 formed on and extending perpendicularly from the lower margin of the baffle 18, so that said support and the fan carried thereby may telescope within the housing assembly when said baffle 18 is swung into closing relation with the greater of the housing compartments.

To provide a somewhat more efficient and completely unitary accessory heater, the electric fan unit 20 may be permanently associated in any desired manner with an apertured closure plate 22 rigidly supported in closing relation with the intake end of the greater housing compartment. Such an arrangement is shown in Figures 1, 2 and 3, the plate 22 being hinged at its lower margin to the frame 16 for actuation through a vertical arc between its closing relation with the greater compartment and its engagement against the baffle 19, to which latter position it may be swung to store a fan assembly within the housing and behind the closed baffle 18, as shown in Figure 3, when the assembly is not in use. It is obvious that the plate 22 could be hingedly associated with the pintle of the baffle 18 to swing in a horizontal arc, or otherwise hingedly or slidingly mounted relative to the housing assembly, as might be deemed most expedient.

In the operation of the accessory heater as shown and described, the insert assembly is normally stored apart from the oven, and when it is desired to use the oven for space heating purposes, the oven door 12 is opened and the insert assembly slidingly mounted within the oven enclosure, and arranged relative thereto as shown in Figures 1 and 5, the adjustable flange portion 16' being extended into engagement with the oven top, if required. With the oven heated and the fan element of the assembly 20 operating, air is circulated inwardly through the greater compartment of the housing against the baffle 19, whereby it is deflected to receive maximum heat from the oven bottom, and outwardly through the lesser compartment for direction into the space to be heated through the agency of the baffle 18. When the space has been sufficiently heated, the fan assembly operation may be discontinued and the oven heat interrupted, the heater assembly remaining in place in the oven behind the closed door 12 or being removed, folded to its compact form and stored for future need. Through the use of the improved accessory heater, rapid and efficient heating can be had to meet temporary needs and emergencies, particularly for brief periods during mornings and evenings when the cook stove would normally be in use.

Since many changes, modifications and variations in the specific form and arrangement of the elements shown and described can be had without departing from the spirit of the invention, I wish to be understood as being limited solely by the scope of the appended claims, rather than by any details of the illustrative showing and foregoing description.

I claim as my invention:

1. The combination with a cook stove oven, of an accessory insert heater comprising an insert housing formed with an open end and adapted for slidable cooperation with the stove oven and having its open end in communication with the air of the room in which the oven is located through the open oven face, means bounding portions of the open end of said housing and arranged to abut against marginal portions of the oven face, means disposed in intersecting relation with the open end of said housing to form a U-shape air passage therethrough, and means operable to circulate air through said passage.

2. An accessory insert heater for use with cookstove ovens, comprising an insert housing formed with an open bottom and one open end and adapted for slidable cooperation with said oven and when positioned therein to have its open housing bottom communicating directly with the oven bottom and its open housing end in communication with the air of a room in which the oven is located through the open oven face, means disposed in intersecting relation with the open end of said housing the form a U-shape air passage therethrough, a deflecting baffle transversely of one branch of said passage arranged to direct incoming air currents toward the open bottom thereof, and means for circulating air through said passage.

3. An accessory insert heater for use with cook-stove ovens, comprising an insert housing formed with an open end and adapted for slidable cooperation with said oven and when positioned therein having the open housing end in communication through the oven face with the room wherein the oven is located, a partition disposed in intersecting relation with the open end of said housing to form a U-shape air passage therethrough, a deflecting baffle transversely of one branch of said passage arranged to direct incoming air currents toward and against the oven bottom, a baffle plate secured adjacent the forward end of said partition for direction of air circulated through said passage and movable into closing relation with one end of said passage, and means for circulating air through said passage.

4. An accessory insert heater for use with cook-stove ovens, comprising an insert housing formed with an open end and adapted for slidable cooperation with said oven and when positioned therein having the open housing end opening into the room where the oven is positioned through the open oven face, a partition dividing the housing into two communicating compartments to form a U-shape air passage therethrough, air directing means forming in effect an extension of said partition at the forward end of said housing and relatively movable with respect thereto, and air-propelling means at one side of said partition for forcing air through said passage.

5. An accessory insert heater for use with cook-stove ovens having heating means therefor comprising an insert housing formed with an open end adapted for slidable cooperation with said oven with the open housing end in communication through the open oven face with the air of the room in which the oven is placed, means disposed in intersecting relation with the open end of said housing to form a U-shape air passage therethrough, and means positioned with respect to one branch of said passage and arranged to effect the passage of the incoming air currents toward a portion of said housing heated by said oven heating means.

MICHAEL F. CAMPBELL.